United States Patent
McGill

(10) Patent No.: US 7,147,365 B2
(45) Date of Patent: Dec. 12, 2006

(54) METHOD OF DISPENSING BLENDED FOOD PRODUCTS

(75) Inventor: Shane R. McGill, West Malling (GB)

(73) Assignee: McGill Technology Limited, Kent (GB)

(*) Notice: Subject to any disclaimer, the term of this patent is extended or adjusted under 35 U.S.C. 154(b) by 0 days.

(21) Appl. No.: 11/222,969

(22) Filed: Sep. 12, 2005

(65) Prior Publication Data

US 2006/0028911 A1    Feb. 9, 2006

Related U.S. Application Data

(60) Continuation of application No. 10/727,559, filed on Dec. 5, 2003, which is a division of application No. 09/933,013, filed on Aug. 21, 2001, now Pat. No. 6,854,875, which is a division of application No. 09/530,325, filed as application No. PCT/GB98/03193 on Oct. 27, 1998, now Pat. No. 6,338,569.

(30) Foreign Application Priority Data

Oct. 29, 1997   (GB) ................. 9722711.0

(51) Int. Cl.
    *A47J 43/046* (2006.01)
(52) U.S. Cl. ............. 366/199; 366/314; 426/519
(58) Field of Classification Search ........ 366/199, 366/251, 314; 426/519, 520, 524
    See application file for complete search history.

(56) References Cited

U.S. PATENT DOCUMENTS

| | | | |
|---|---|---|---|
| 1,351,243 A | 8/1920 | Graves | |
| 1,519,798 A | 12/1924 | Pilkington et al. | |
| 2,162,400 A | 6/1939 | Heath | |
| 2,930,596 A | 3/1960 | Waters | |
| 4,422,770 A | 12/1983 | Geible | |
| 4,487,509 A | 12/1984 | Boyce | |
| 4,708,487 A | 11/1987 | Marshall | |
| 4,889,248 A | 12/1989 | Bennett | |
| 5,090,816 A | 2/1992 | Socha | |
| 5,353,697 A * | 10/1994 | Venturati et al. | 99/492 |
| 5,809,872 A * | 9/1998 | Sundquist | 99/492 |
| 5,855,431 A | 1/1999 | Costanzo | |
| 6,338,569 B1 | 1/2002 | McGill | |
| 6,854,875 B1 | 2/2005 | McGill | |

FOREIGN PATENT DOCUMENTS

| | | |
|---|---|---|
| DE | 30 46 157 A | 7/1982 |
| DE | 89 15 094 | 2/1990 |
| EP | 0 562 310 A | 9/1993 |
| FR | 1 565 187 A | 4/1969 |
| KR | 1996-0007233 | 8/1996 |

* cited by examiner

*Primary Examiner*—David Sorkin
(74) *Attorney, Agent, or Firm*—Nixon & Vanderhye P.C.

(57) ABSTRACT

A food blending apparatus and a method of blending food within a container with the object of providing a hygienic system whereby disposable containers are charged with product at a location remote from consumption. After filling with ingredients the container is sealed and then cooled. Containers include an integral blender which when connected to a drive enable the product to be blended at the point of consumption after location in driving connection with the drive means. Product is accessed through a sealed opening of the container after opening the seal. After consumption the container is disposed of and is constructed to make disposal economical.

9 Claims, 7 Drawing Sheets

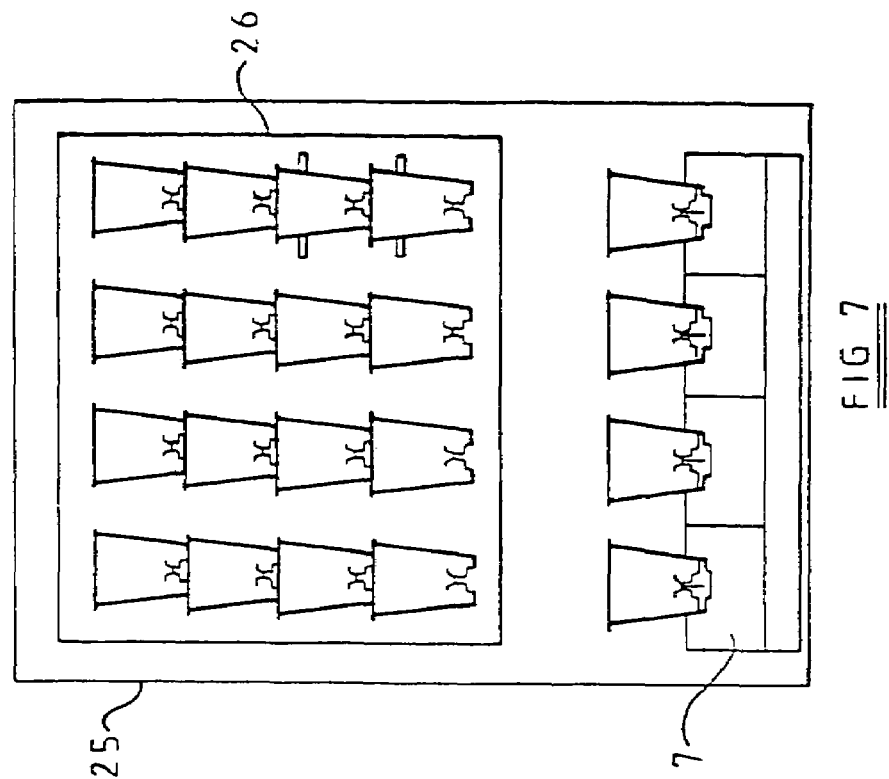
FIG 7
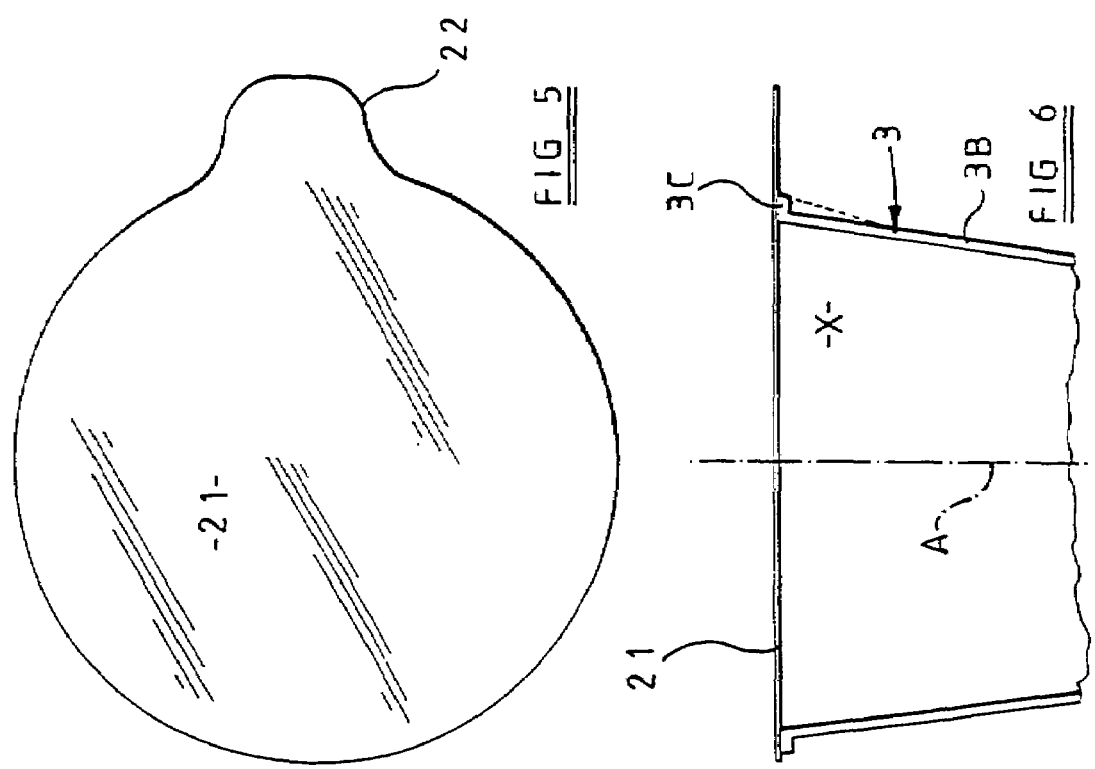
FIG 5
FIG 6

FLAVOURS ON TOP

PARTICULATES ON BOTTOM

EXAMPLE OF TWO COMPONENTS
PACKED VERTICALLY

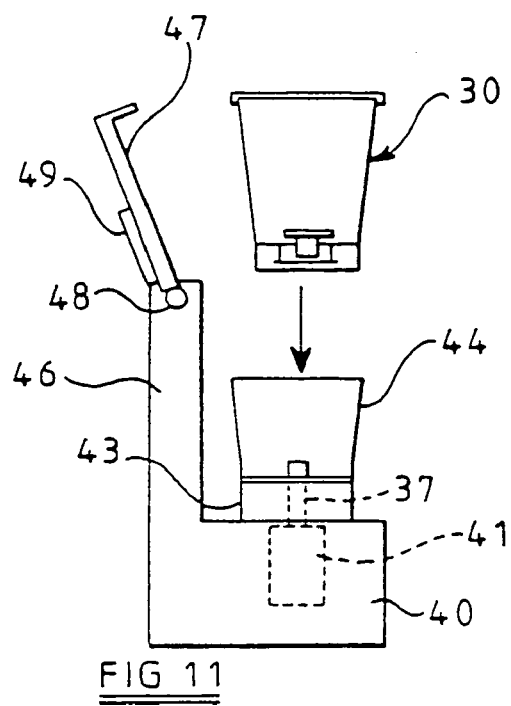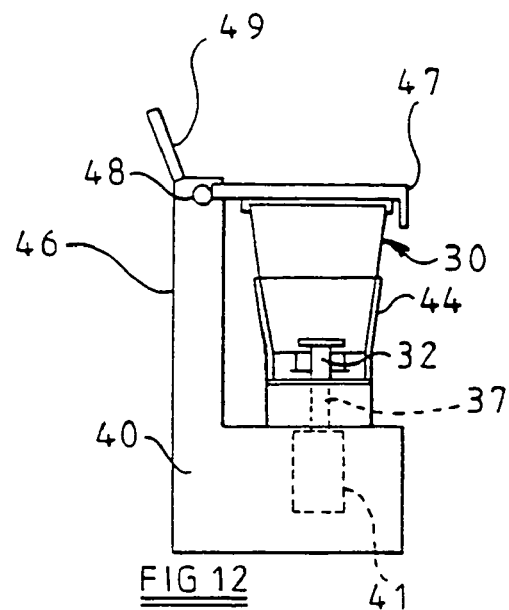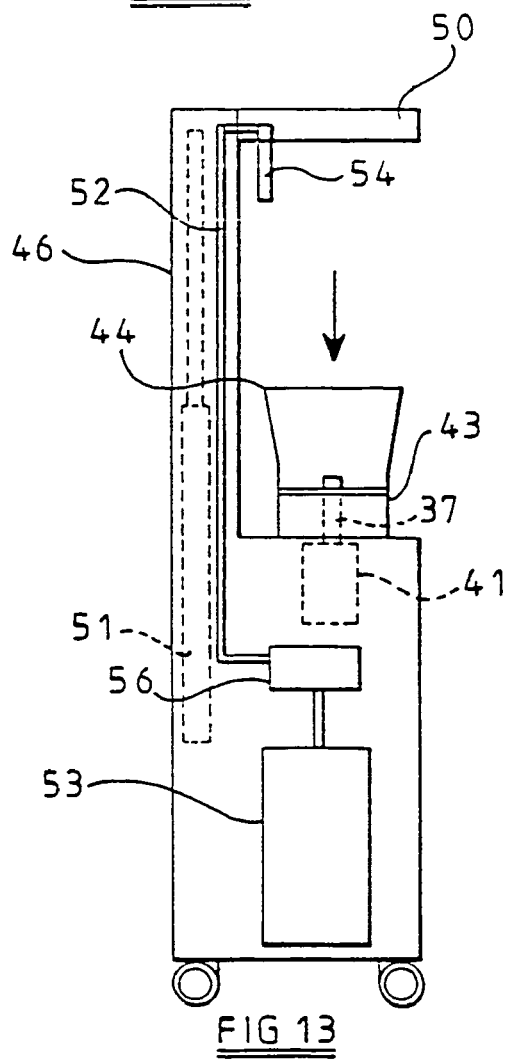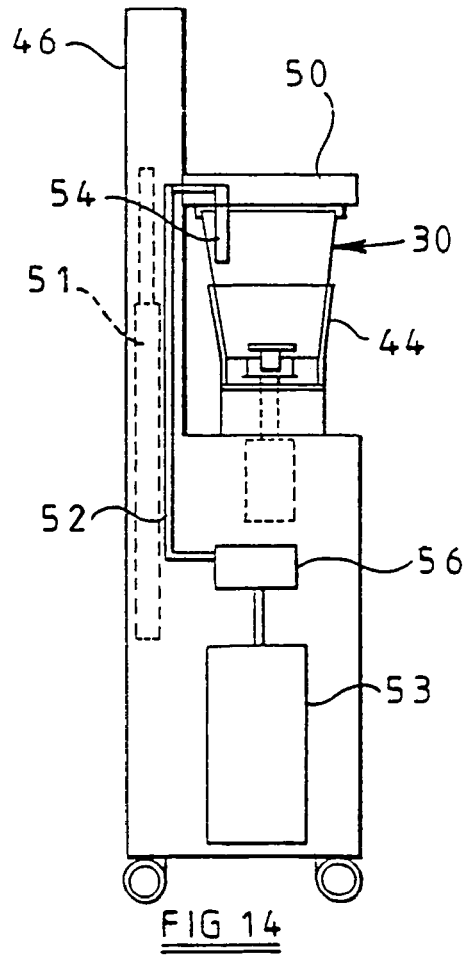
FIG 11
FIG 12
FIG 13
FIG 14

METHOD OF DISPENSING BLENDED FOOD PRODUCTS

This application is a continuation of U.S. patent application Ser. No. 10/727,559, filed Dec. 5, 2003, pending; which is a divisional of U.S. patent application Ser. No. 09/933,013, filed Aug. 21, 2001, now U.S. Pat. No. 6,854,875; which is a divisional of U.S. patent application Ser. No. 09/530,325, filed Apr. 28, 2000, now U.S. Pat. No. 6,338,569; which is the national phase of PCT International Application No. PCT/GB98/03193, filed Oct. 27, 1998, abandoned; which claims priority of Great Britain Patent Application No. 9722711.0, filed Oct. 29, 1997, the entire contents of which are hereby incorporated by reference in this application.

BACKGROUND OF THE INVENTION

This invention relates to food blending apparatus and to a method of blending food within a container. The invention has particular application to milk shakes but can be used with other food products which need to be blended, particularly those which need to be dispensed ready for consumption in retail premises.

Hitherto milk shakes have been produced by manually placing ice cream, milk and flavouring into a blender jug into which a blender is inserted to produce the blended milk shake. The milk shake is then poured into a receptacle from which the customer consumes the product. The blender jug then has to be cleaned and sanitised for re-use. However, in the present fast food market there is a demand for a better system for producing milk shakes taking account of health regulations, labour costs, waste, product quality and the level of skill of the operator. Current milk shake systems provide for improved pasteurisation but such systems are more expensive and more complicated. Moreover some of such systems are limited in the flavours which can be produced.

SUMMARY OF THE INVENTION

An object of this invention is to provide food blending apparatus and a method of food blending which overcomes problems with existing systems.

According to the invention a method of dispensing blended food products such as milk shakes in disposable containers having integral blending means located internally of the container, which blending means is drivingly connectable to drive means externally of and separate from the container, wherein the container is made and nested with other containers, the container is de-nested, charged with product ingredients at a charging location remote from a dispensing location, the container is sealed to seal the ingredients within the container, the container and its contents are cooled to at least a serving temperature, at the dispensing location, the blending means is releasably drivingly connected to said drive means, and the drive means is actuated to cause the blending means to operate and blend the ingredients within the container, access is gained to the blended food product within the container whereby to consume said blended product from the container, and the container is disposed of.

Preferably the container is charged with ingredients at the charging location at which containers are de-nested from one another.

Conveniently each container has an upper open end in which another container is nestably locatable and, after de-nesting containers, the open end of the container acts to receive the product ingredients, said open end being sealingly closed after charging the container with said ingredients. Sealing may be by applying a heat sealed closure, by the use of a snap-on lid, or both according to the temperature at which the filled container is to be stored and transported.

In one arrangement the container has a lower end in which the blending means is located and access to the blending means is sealed at said lower end with removable sealing means.

According to another aspect the invention provides a container for use in the method of the invention which comprises a nestable vessel having an upper opening through which food product ingredients are chargeable into the vessel, sealing means for sealing said upper opening and two or more of said vessels being constructed to be nestable when empty by locating one inside the other through said upper opening, the container having integral blending means including an impeller rotatable relative to the container to blend said ingredients within the container, location means for securing the impeller rotatably in the container, drive connection means associated with the impeller and accessible externally of the container for driving connection with drive means whereby the impeller is rotated, the blending means being permanently united with the container, and the container being constructed to be disposable after blending and consumption of food product from the container.

Conveniently said vessel is of circular cross-section tapered towards one end whereby to locate and nest two or more vessels inside one another, the narrower end of each vessel being insertable inside the wider upper opening of another vessel.

The rotatable element and the associated coupling means may be located on the lid or at the base of the container remote from the lid. When the rotatable element is in the lid, the container is usually inverted for engagement with the drive means.

If the rotatable element is located in the base of the container, the container is usually located in an upright position during engagement of the drive means.

The drive means is conveniently incorporated into a support for the container on which the container is located during blending of product within the container, the support incorporating the drive means and its associated prime mover. The support may be located within a refrigerated cabinet. There may be included means for feeding containers to a blending position which can be initiated by coin freed means for self service.

The blending means is arranged to cause product in the container to be blended upon rotation thereof and is conveniently located centrally of the container and has outwardly directed portions extending from the axis of rotation.

According to a further aspect the invention provides food blending apparatus comprising a container including a nestable vessel having an upper opening through which food product ingredients are chargeable into the vessel, sealing means for sealing said upper opening, two or more vessels being nestable within one another when empty by locating one inside the other through said upper opening, the container having integral blending means within the container including an impeller for blending the ingredients within the container, location means for securing the blending means rotatably in the container, drive connection means associated with the impeller and accessible externally of the container for driving connection with drive means, a mounting for mounting the container and incorporating the drive means, whereby upon mounting the container on the mounting means in driving connection with the drive means the impeller is rotatable, the mounting means providing a seating for the container during blending.

Preferably the seating has a portion shaped according to the external shape of the container whereby supporting the walls of the container during blending.

The components of the container, its sealing member and the rotatable blending element are conveniently of plastics material so that these components may be disposed of after the food product has been consumed. Moreover the container may be supplied for use containing food product to be blended. Thus this enables pre-filled containers to be supplied from a source, such as a factory, already filled with product ready for use by a retail outlet in a variety of food compositions and flavours, thus obviating the need for the retail outlet to store product for filling into the containers. In addition, due to the nature of the apparatus, food product cannot come into contact with associated apparatus before and during blending. Nevertheless the blended product is readily accessible by the user. Hygiene problems are overcome by this approach whilst still giving the opportunity for a wide range of products to be sold.

The filled containers may be supplied with components of the product layered within the container in horizontal or vertical layers, the blending process bringing about the desired blended product. If desired it is also possible for the product to be aerated within the container in addition to a blending process. Alternatively aeration of product may be achieved before feeding product into the container. As a further option the containers may be kept cold and/or ice may be present or introduced into the container to be incorporated into the blended product.

By the provision of containers filled with product and incorporating as part of the container a rotatable blending element full blending is obtained and there is no sanitising or hygiene problem. The container assembly can be made cost effective by the use of plastics components even though the container may only be used for one serving of product.

BRIEF DESCRIPTION OF THE DRAWINGS

Further features of the invention will appear from the following description of various embodiments of the invention given by way of example only and with reference to the drawings, in which:

FIG. 5 is a plan view of a closure for the container of FIG. 6, FIG. 6 is a vertical section showing the closure of FIG. 5 on the container of FIG. 4, FIG. 7 is a vertical section through apparatus for feeding containers, according to FIG. 4, to blending stations, FIG. 11 is a side elevation in vertical section through food blending apparatus prior to use, FIG. 12 is an elevation corresponding to FIG. 11 in the operative blending position, FIG. 13 is a side elevation in vertical section through other food blending apparatus prior to use, FIG. 14 is an elevation corresponding to FIG. 13 in the operative blending position.

DETAILED DESCRIPTION OF PREFERRED EMBODIMENTS

Figure 1:
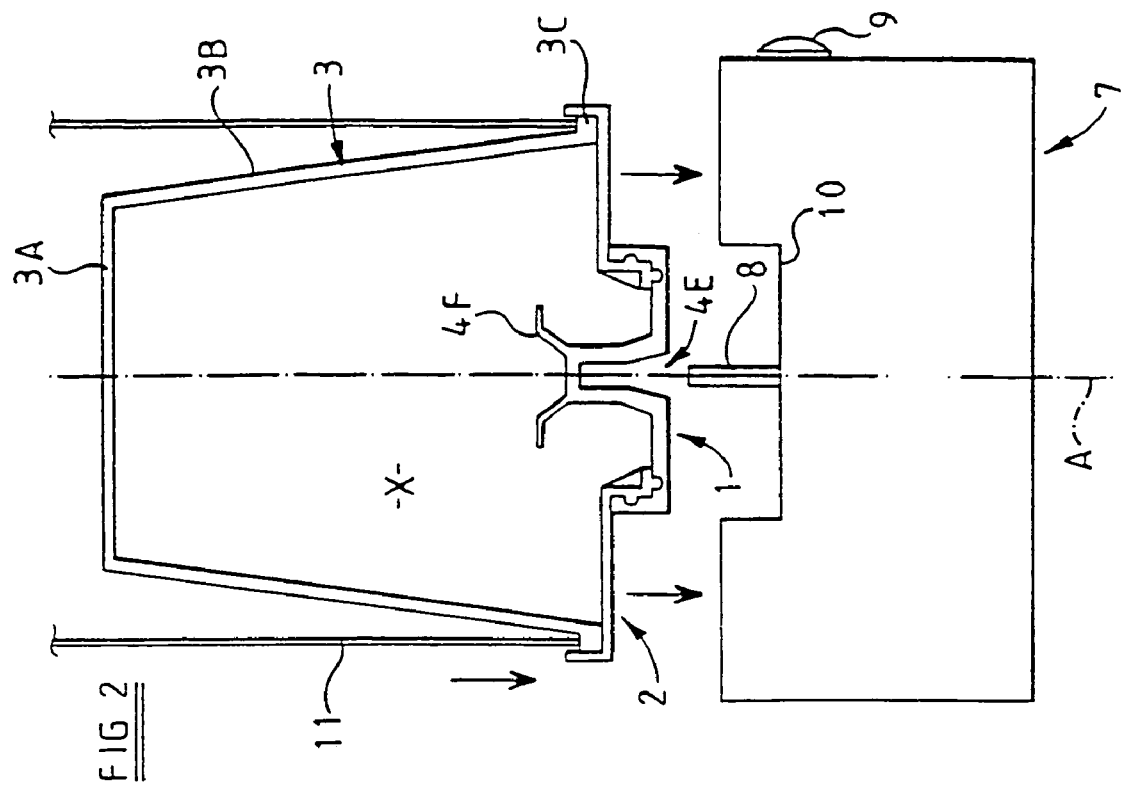
FIG. 1 shows a vertical section through a food blending container for use with food blending apparatus, the lid part of the container being shown disassembled in the upper part of FIG. 1.

Referring to the drawings and firstly to FIG. 1 there is shown a container for use in blending apparatus which comprises a body portion 3 consisting of a plastics vessel in the shape of a beaker having a base 3A, upwardly diverging, circular cross-section side walls 3B and an upper edge 3C of the container 3 with an outwardly directed lip. The container is nestable with other containers by location of the base through the upper opening of another container.

The container body or vessel 3 is provided with a closure member 2 constituting a lid arranged to fit over the upper end of the body 3 and to close the opening at the top of the body. The lid 2 is generally circular having an outer portion 2A which fits over the upper end 3C of the body 3 to be sealingly engaged over the opening. This may be by a clip arrangement, by heat sealing, or by any other suitable means for securing the lid 2 on the body 3.

At the centre of the lid 2 is formed a rotatable blending element or impeller 1 sealingly carried on the lid 2 but for rotation relative thereto about the axis A of the container. The blending element 1 is retained on the lid by circular retaining portions 4 formed on the lid 2 which engage in corresponding circular grooves 4A formed in the member 1. The retaining portions 4 are formed on an upstanding, inverted L-shaped portion 4B of the lid 2 which extends around a central opening 2A formed in the lid 2. Other means may be used to obtain seals but which also permit relative rotation between the element 1 and its support.

The blending element 1 fits over the circular L-shaped member 4B by the provision of a correspondingly shaped portion of the element 1 which extends inwards over region 4C towards an integral impeller portion 4D which extends downwards into the body of the container and defines a hollow central portion 4E shaped to be engageable by drive means, to be described. At the lower end of the impeller portion 4D is formed an outwardly directed impeller member 4F which, in this case, is a downwardly inclined and outwardly directed shaped member. In practice the impeller member 4F is shaped to give the desired blending action to product within the product space X within the assembled container according to known practice. Thus, for example, the impeller member may have inclined surfaces to help to generate a vortex within the product in space X, or there may be individual arms extending outwardly from the axis with or without inclined surfaces. Alternatively the impeller member may give a gentle mixing action, in which case the impeller may comprise a disc.

A removable diaphragm 6 may be provided on the rotatable member 1 for releasable location closing the opening 4E. The purpose of the diaphragm 6 is to seal the container during transit, the diaphragm 6 being removable prior to placing the assembled container with product on associated apparatus whereby the product within the container is blended. The diaphragm may be heat sealed to the lid 2 and, instead of removable, it may be pierced by drive means 8 for rotating the element 1.

As will be seen from FIG. 1 the lid 2 may be formed with a sealed opening through which a straw 5 may be inserted, after blending, to enable the product to be drawn out of the container with the straw. The straw 5 may be inserted through an existing opening or through a weakened area of the lid 2 to gain access to the product, in known manner. Alternatively access for the straw may be through an opening covered by a removable diaphragm or through a moulded tube of which a closed end may be removed for access by the straw. Alternatively the lid 2, together with the associated rotatable blending element 1 is removable, after blending, to gain access to the product within the container body 3 after blending.

Figure 2:
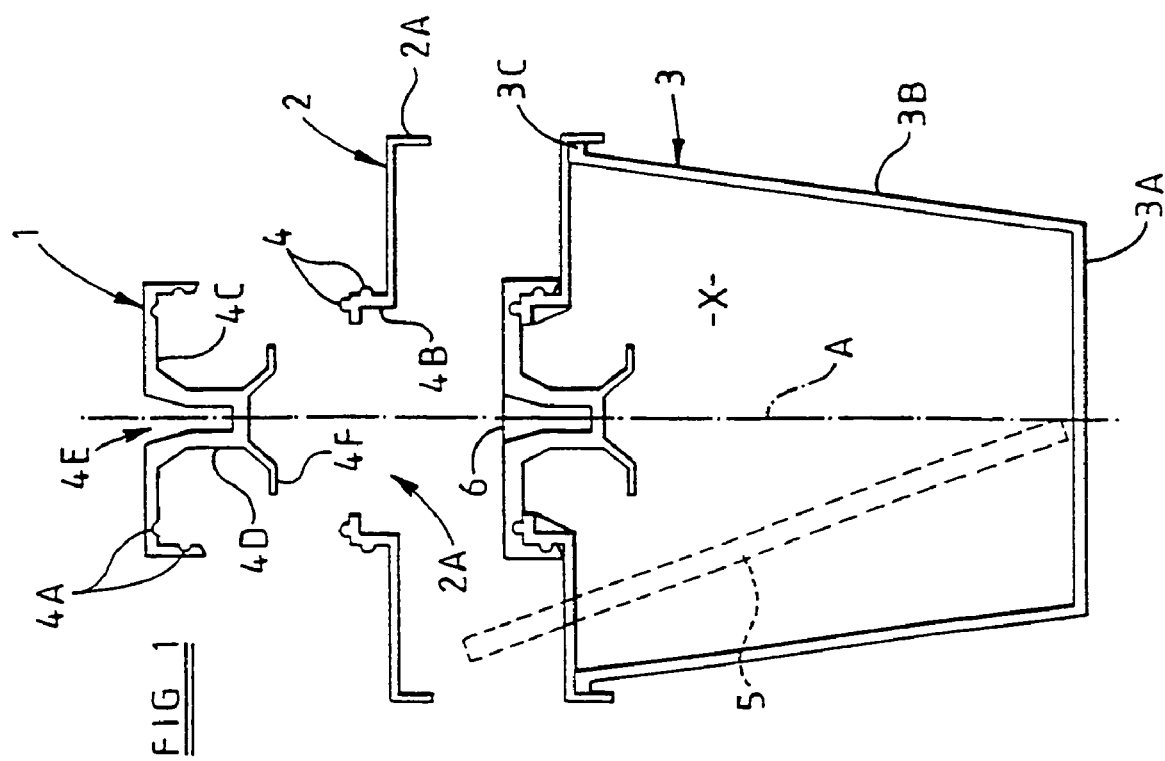
FIG. 2 shows the container associated with a support and drive arranged for a blending process.

Referring now to FIG. 2, the container of FIG. 1, after assembly and with product within the container, is inverted, as shown, to effect a blending action. In FIG. 2 there is shown a housing 7 which acts as a support for the container and which houses a drive motor (not shown) from which is directed a drive shaft 8. A stop-start switch 9 is located on the housing 7 to actuate the drive motor and drive shaft 8, or the motor may be started by a proximity or pressure switch operated by location of the container on the support.

The drive shaft 8 is arranged to drivingly engage the opening 4E of the rotatable blending element 1 so that as the drive shaft 8 is rotated it rotates the element 1 to blend product within the container. The drive shaft 8 is located to extend from a recessed portion 10 of the housing 7, the recessed portion receiving the rotatable element 1 for rotation with the drive shaft 8 and the upper surface of the lid 2 being supported on the upper surface of the housing 7 around the recess 10. The container is retained on the housing 7 by a locking tube 11 which surrounds the container body 3 and moves reciprocally to engage with the lip 3C of the body 3 during a blending operation.

Thus it will be seen that the container is held in position by the tube 11 with the container seated on the housing 7, the product is blended by operation of the drive shaft 8 to rotate the element 1 and cause product within the space X to be mixed, aerated (if necessary) and blend the different components of the product thereby forming a blended product in the desired manner.

After the product is blended the tube 11 is withdrawn from engagement with the container and to permit the container to be removed from the housing 7 ready for use and consumption.

Figure 3:
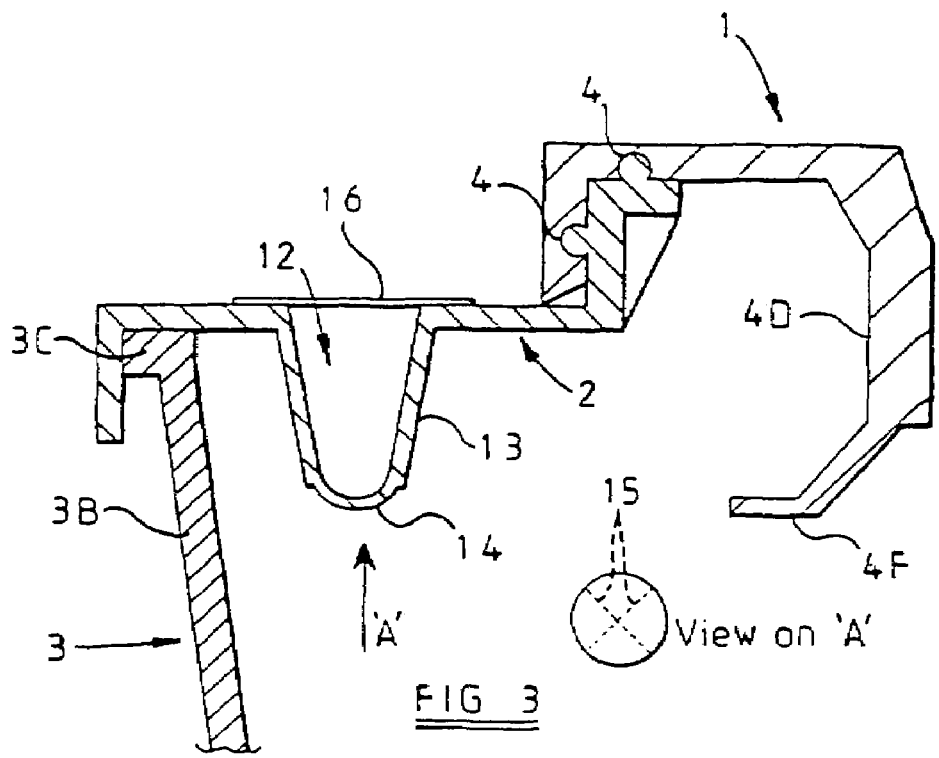
FIG. 3 is a scrap vertical section showing an optional feature of the container of FIG. 1.

Referring to FIG. 3, there is shown an optional feature of the container of FIGS. 1 and 2. In this arrangement a portion of the lid 2 between the member 1 and the edge of the lid is formed with a circular opening 12 from which inwardly extends a depression 13 at the lower, inward end of which is formed a closure 14 which includes weakened portions as seen at 15 in the scrap view A of FIG. 3. The opening 12 may be sealed by a diaphragm 16 over the upper end of the opening, the diaphragm being removable by peeling off or otherwise.

The purpose of the opening 12 in the lid 2 is to give access into the container for a nozzle through which pressurised gas may be injected into the product. The nozzle (not shown) may be inserted through the base of the opening 12 breaking the frangible or weakened areas 15 in said base of the container or by the base being open and being normally sealed with a diaphragm at its upper end. By this means contamination of the nozzle is avoided or minimised. Alternatively the nozzle can seal with the side walls of the depression 13, the pressure of the gas breaking open the portion 14 by breaking through the weakened lines 15. The diaphragm 16 provides added security to prevent product escaping through the opening 12. Another opening in the lid may be provided for releasing pressure in the container, for example if it exceeds preset levels. An exhaust gas nozzle may be introduced through said further opening.

It will be seen that the opening 12 is offset from the centre of the container but, if desired, the opening may be central with the impeller 1 offset to one side of the axis A.

Figure 4:
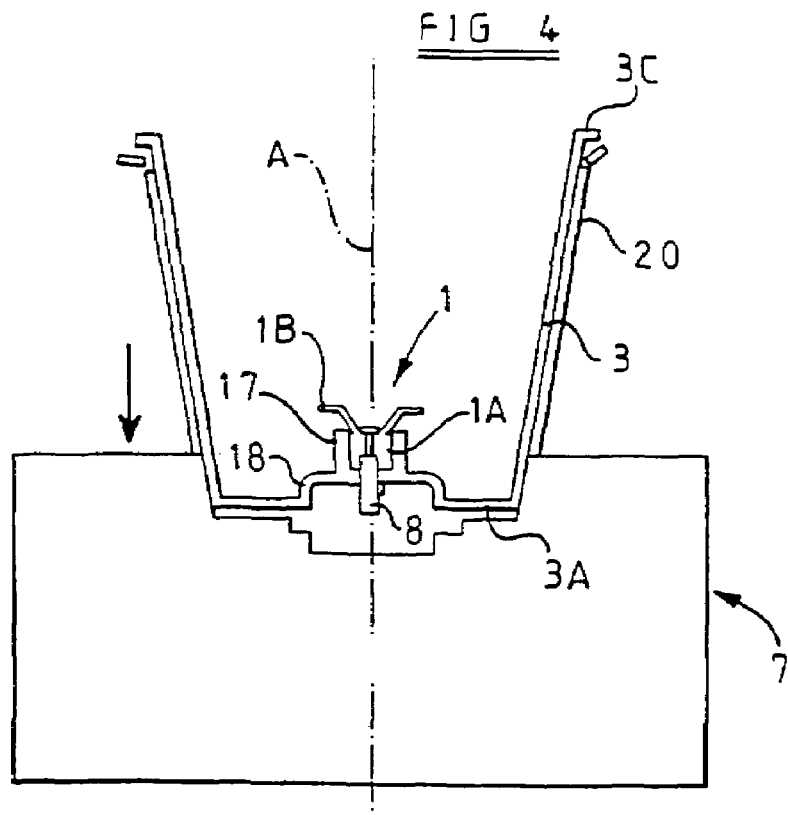
FIG. 4 is a vertical cross section through blending apparatus with a container in another embodiment.

Referring now to FIG. 4, there is shown blending apparatus similar to that of the previous embodiment except that in this case the rotatable blending element or impeller 1 is located in the base 3A of the container body 3. Thus the container comprises a container body or vessel 3 of similar shape to that previously described with an outwardly directed lip 3C and a base 3A. A rotatable blending element 1 is located centrally of the base 3A and is supported sealingly in relation to the base for rotation about the axis A. The element 1 has a central body 1A having a lower opening shaped to drivingly receive a shaft 8. The shaft 8 is drivingly connected to a drive motor (not shown) located in a housing 7.

The element 1 includes upwardly inclined and outwardly directed impeller elements 1B which are arranged to cause product within the container to be blended by the mixing of product within the container, sometimes by creating a vortex of product.

The body 1 A is sealingly located for rotation relative to walls 17 formed integrally with the base 3A and extending upwardly from a dished portion 18 in which is formed an opening for gaining access to the element 1 by the drive shaft 8. Suitable seals (not shown) are provided for enabling the element 1 to rotate within the walls 17 whilst maintaining a seal against the flow of product from the container.

In FIG. 4 the container is shown in a blending position in the housing 7, the base 3A being seated on the housing. The sides of the container body are, as shown, located within a correspondingly shaped, outwardly diverging receiving member 20 which may be heated.

As shown in FIG. 6 the upper end of the container of FIG. 4 may be sealed by a diaphragm 21 which is sealingly secured to the upper end of the container body by heat sealing and which may be peeled off by use of a tab 22 extending to the side of the container which, when not in use, may be laid down the side of the container. After removal of the diaphragm 21 a lid (not shown) may be applied to the container. Alternatively the diaphragm may remain in place and a lid with a protrusion to puncture the diaphragm may be applied to provide an inlet for a straw.

With the arrangement described in relation to FIGS. 4, 5 and 6 the location of the blending element 1 in the base of the container 3 may not always lend itself to accessing product within the container, especially when a spoon is to be used. In such a case the container version when the rotatable element is in the lid may be preferred, as in the embodiment of FIG. 1.

Figure 8:
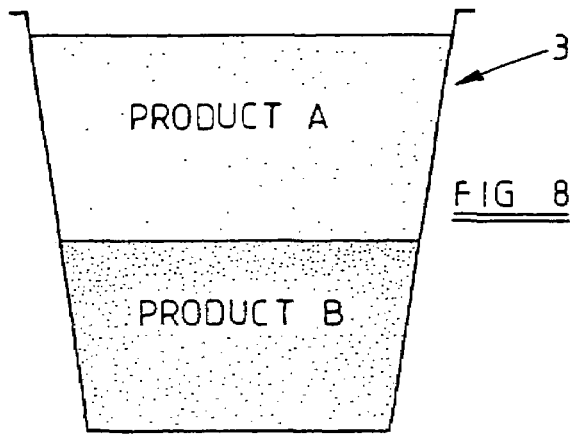
FIGS. 8 and 9 show vertical cross-sections through a container showing different product locations prior to blending.
Figure 9:
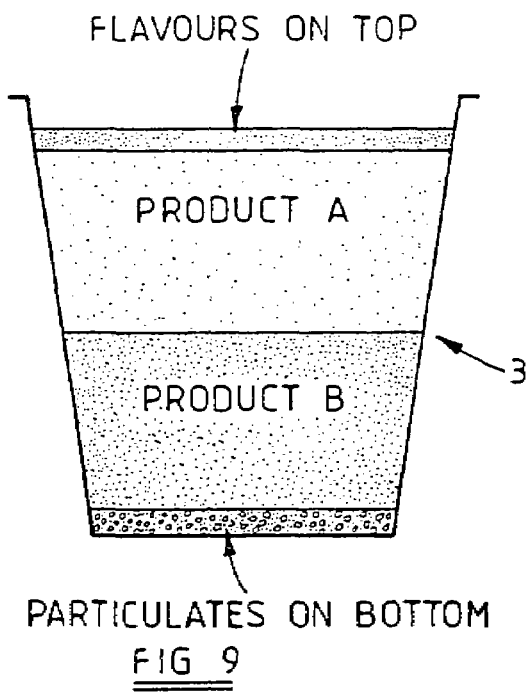
Figure 10:
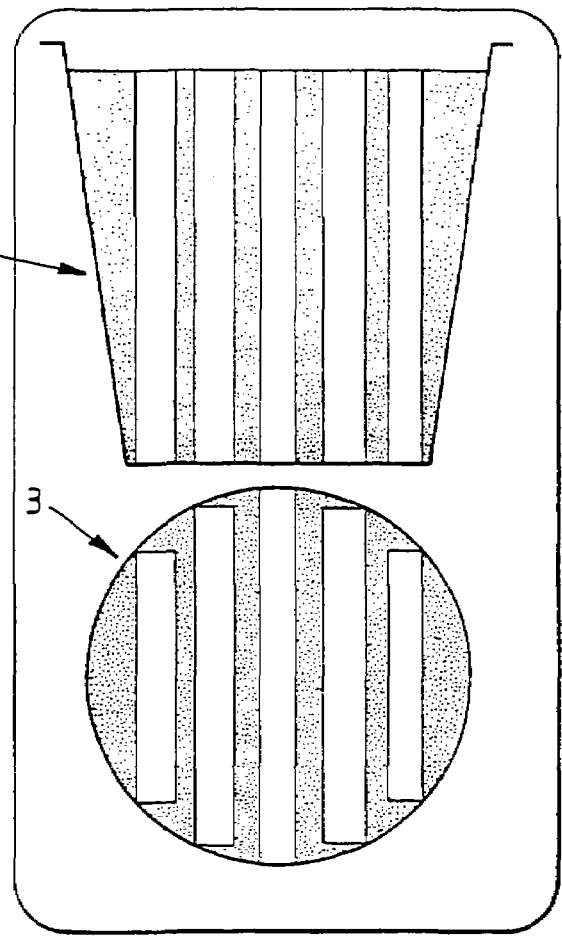
FIG. 10 shows a vertical and a horizontal cross-section through a container showing further product locations within the container prior to blending.

Product to be blended in the container can take a variety of forms but generally consists of two or more components for example dairy fat, sugar, emulsifiers, stabilisers, milk, flavouring, ice etc. These components may be pre-filled into the body 3 of the container at a central location or can be filled at the place of consumption. In either case the component products may be layered as shown in FIGS. 8, 9 and 10. In FIG. 8 a two component product is illustrated in which one component is located in the lower part of the body 3 and the other component in the upper part. In FIG. 9 there is a similar arrangement except that a further component is layered onto the top of the container, for example a flavour component. In the base of the container is located another layer of component, for example particulates such as nuts. Alternatively there may be a single product in which ice may have formed as crystals within the product. Blending can be used to break down the crystals into small ice particles. Moreover blending may be of a single product of which a blended consistency is required. In some cases product does not occupy the entire container when filled to allow for aeration and expansion of blended product in the container.

In FIG. 10 is shown another arrangement in which components are located within the container in vertical layers. This may be by filling the container from a dispenser in such a component array.

Referring now to FIG. 7 there is shown a blending apparatus, in this case incorporating containers of the kind shown in FIGS. 4, 5 and 6. In this apparatus there is an outer housing 25 in the base of which is located a plurality of side by side motor housings 7. In an upper storage housing 26 is located vertical stacks of filled containers for access by the operator. Containers, filled with product, from the housing 26 are released from the stacks for location on the motor housing 7 for blending purposes and each of the stacks may have containers with different product formulations so that a choice of, in this case, four different product formulations may be available for blending and dispensing.

There are various other aspects of this invention which can be adopted amongst which is that the operation of the blending action can be timed to provide a blending action for a predetermined period, and the operation of the locating means for the containers can also be timed to match the duration of blending.

Instead of the lid being removable for access to product, or the use of a straw to access product, the lid may have a portion which can be torn off to give access to the product. Moreover the lid may be removable to insert additives into the product-prior to or after blending. For example if the apparatus were used for cocktails with an alcohol content the alcohol can be added before, during or after blending.

The containers may be filled with product and supplied to the user without the lid being fitted to the container and with a simple peel-off or tear-off cover. This allows the lid and associated blending element to be fitted at the point of sale prior to blending, or when serving. The blending elements may be constructed to allow the elements to be nested one inside the other to provide minimum volume during shipping and also to permit handling on automatic machinery.

The motor housing may have more than one drive shaft extending therefrom to permit several containers of product to be blended at the same time.

Instead of the arrangement of FIG. 7 other automatic feed arrangements can be used for transporting containers from a refrigerator or freezer; the containers being moved into position onto static drive arrangements or, alternatively, the drive shafts may be mounted for movement along a linear or rotary path into position for the containers. Similarly the blended containers can be moved from a blending position along a conveyor or other transport means.

For efficient blending of the product its viscosity should allow a vortex to be formed inside the container whilst the product is being blended or liquid may be added at blending. When multiple components are included in the product they may be deep frozen for ease of distribution and storage. The product may then be placed in a tempering cabinet, held at a specified temperature, to warm the product up to the required blending temperature which may be between +5° C. and −10° C. dependent on the type of product. Once the blending temperature has been reached inside the tempering unit the components will have different consistency. Thus one element may be a liquid of low viscosity to act as the vortex catalyst during blending whilst another component contains other products and solids required in the final product. It may be advantageous to have the low viscosity component located in the container adjacent the impeller so that this liquid is in direct contact with the rotary blending element during the blending process. A single component may be fed into the container which separates into two or more components during storage and prior to a blending operation.

The components of the product can be extruded into the container, they may be fed by volume using piston and cylinders, or they may be fed by time lapse arrangements or by other means. A different filling station will usually be required for each component of the product and air may be introduced into the product during the processing and filling stage. Similarly flavouring liquids can be included in the container as a separate component at the blending stage rather than introducing the flavoured components when the container is packed. Moreover particulate components may be added with low water content components to achieve the best conditions for blending.

Addition of components may also be conducted shortly before the blending operation and these components may be introduced through an opening in the container lid, for example the opening for the straw, either manually or automatically.

The material from which the container body 3, lid 2 and rotary element 1 are made will usually be plastics material, preferably being recyclable plastics. The various parts of the container may be made by injection or thermo moulding and the container will be of thin walled plastics to suffice for a single use requirement and disposal after use.

The motor driving the blending operation may have means for detecting the driving torque to ensure that the maximum torque applied does not exceed a pre-set level. This would ensure that where the product within the container is of the incorrect consistency (perhaps due to being the wrong temperature) blending cannot occur since the rotary element may be unable to withstand the forces involved. However the rotary element should be made of material which will not fracture but will distort if overload should occur. In addition the connection between the drive shaft and the rotary member may be such that, if excessive forces are applied, the opening in the rotary element will distort and allow freewheeling of the drive shaft. In addition the torque on the impeller or the current to the drive motor can be detected to determine the viscosity of the product during blending. This enables the motor to operate until the blended product reaches the desired viscosity.

The lid 2 may be heat sealed to the container body 3A to effect a permanent connection and in this case the lid may have a peel-back or tear-off portion to allow the product to be poured out of the container. This arrangement would be particularly appropriate for products such as frozen cocktails. Moreover the product may be consumed direct from the container.

The containers with at least part of the product contained therein may be kept at ambient temperatures without the need for refrigeration, especially if UHT products are used and the container is kept in a sterile condition. The container is kept in a sealed condition, cooled and the seal removed for use with the possible addition of low temperature or other product before dispensing. The low temperature product may be ice, cold liquid, or both and, after blending, a chilled or frozen dessert may be provided.

The apparatus of the invention may be used for cold or frozen products but can also be used for products at ambient or higher temperatures, such as hot chocolate, custard, sauces, mashed potato, tea, coffee etc. For this purpose the blending operation may be performed in an environment in which a microwave heating facility can operate.

Instead of the containers being filled remotely from the point of sale, filling can take place at or close to the point at which blending takes place. Freeze dry components, liquids and ice can be added at point of sale, the lid then being fitted and the product being blended and served to the customer. Feeding of components of product into the container may be manual, semi-automatic or fully automatic. When ice is used, such as crushed ice, the rotary member can break down the ice to a suitable size for the product. Moreover other cooling material such as frozen carbon dioxide, or carbon dioxide 'snow' produced from liquid carbon dioxide, can be inserted into the container for mixing and chilling the product before or during blending.

Compressed gas such as carbon dioxide may be used for chilling product and carbonated drinks may be produced by injecting pressurised carbon dioxide gas before or during blending of the product. A temperature detector may be employed to control the amount of chilling required.

In the blending apparatus described thus far it is intended that the container, its lid and the rotary member be disposable after blending and consumption. However a non-disposable, re-usable rotary element may be employed which is fitted to a lid which is applied to the container during blending. The rotary element would be easily removable from the drive for cleaning after use and may be formed of more durable material, such as metal components, cleanable in dishwashing apparatus.

The motor for driving the rotary element may be powered by batteries, the usual electricity supply or by air motor, the latter being from a compressed air reservoir or otherwise.

If the product to be blended needs to be heated steam injection or hot water addition can be used.

If different sized containers are required common components can be employed for the lid and rotary element assembly with the container being of different depths. In this way the customer can be offered a full range of sizes without difficulty.

If it is desired to have chilled or partly frozen product, the containers with product may be kept at a low temperature such, for example, as to form ice crystals inside the container which are then blended with the product during the blending stage. Moreover by chilling or freezing the product close to the point of sale using suitable product components, the filled containers can be transported at normal ambient temperatures, then chilling or freezing the product upon arrival at point of sale.

Figure 15:
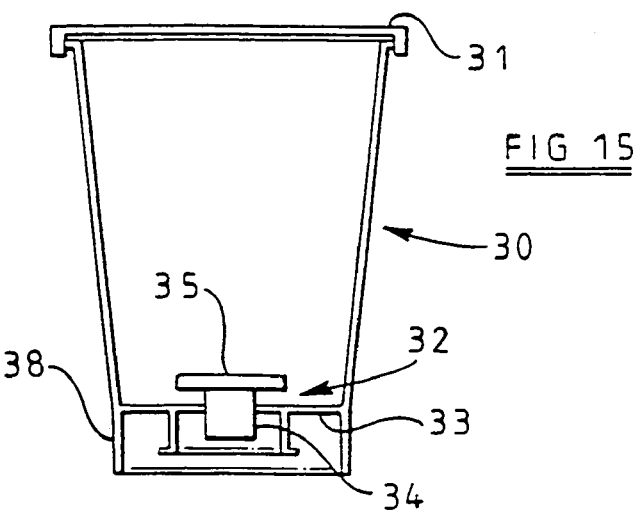
FIG. 15 is a vertical section through a blending container as used in the apparatus of FIGS. 11–14.

Referring now to FIGS. 11–15 and firstly to FIGS. 11 and 12 there is shown an alternative blending apparatus using containers 30 such as shown in FIG. 15.

In FIG. 15 the container 30 shown is, in common with the previously described container, formed of thin-walled plastics and is of circular cross-section tapering from its lower end upwardly so that containers are nestable, one inside the other, with the lower end of one container inserted into the upper open end of another container, when empty.

The container 30 is shown with a lid 31 or other sealing member over its open end and the lid is preferably heat sealed to the open end after filling with product, usually filling to a position spaced from the lid to allow for the product to occupy the full space within the container after blending. Alternatively or in addition a membrane is fitted to the open end and secured by heat sealing.

Towards the lower end of the container is a blender 32 journalled into a base portion 33 of the container and having a shaft 34 and a blending element 35. The shaft has at its lower end means (not shown) for placing a drive shaft 37 in driving engagement with the blender 32 and its associated shaft 34. Conveniently drive is through a dog engagement so that the container is placed in position for blending without any twisting action being necessary to secure driving engagement. The shaft 34 projects into an inner skirt portion the lower end of which is usually closed during transit by a membrane heat sealed to the lower end, especially when aseptically prepared product is employed.

Extending below the level of the base portion 33 is a skirt portion 38 projecting below the level of the shaft 34 and defining at its lower edge, a base on which the container stands.

The container 30 is intended for use with the apparatus of FIGS. 11 and 12 or FIGS. 13 and 14 by which a container 30, charged with product, is placed on the apparatus and the product is blended for consumption. In FIGS. 11 and 12 the apparatus comprises a mounting base 40 in which is located a drive motor 41 directed upwardly from which is a drive shaft 37 for driving engagement with a shaft 34 of the blender 32.

Above the base 40 is a mounting platform 43 formed with an upwardly extending seating 44 shaped to receive the container 30 as a close fit and terminating short of the upper end of the container 30 when placed in the seating. Thus for a blending operation the container 30 is placed in the seating 44 whereby the drive shaft 37 is engaged with the blender shaft 34 of the container.

Extending upwards from the base 40 is a vertical support member 46 which has at its upper end a pivotable arm 47 pivoted about axis 48 between the position of FIG. 11 and that of FIG. 12 which is a container access position and a container secured position respectively. In the latter position the arm 47 has been lowered to engage the upper end of the container 30 to secure the container for a blending operation. The arm 47 may be powered between said positions and include a proximity switch so that blending cannot occur unless the arm is in the container secured position. Alternatively the arm 47 is gravity operated. In this case the arm 47 in the FIG. 11 position is supported by support 49, and is manually moveable about the axis 48 to lower under gravity to the FIG. 12 position. A catch or other location means (not shown) may be provided to prevent unintended movement from the FIG. 11 position.

The base and in particular the seating 44 may have heating means whereby the seating 44 is heated to heat the wall of the container 30 when the container is placed in the seating. Such heating may be advantageous in obtaining adequate blending especially when product within the container is frozen and has a tendency to become attached to the inner wall surface of the container.

The drive motor 41 may be a variable speed motor, such as DC motor, to permit different operational speeds for different products. Moreover the motor may be controlled to operate for different preset periods according to the product. These features may also be applied to the other versions of the apparatus described.

Referring now to FIGS. 13 and 14 similar apparatus is shown to that of FIGS. 11 and 12 and the same reference numbers are applied to similar parts. FIG. 13 shows the apparatus ready to receive a charged container 30 (FIG. 15) and FIG. 14 shows the apparatus in an operational blending mode.

In the embodiment of FIGS. 13 and 14 the apparatus has injection means for injecting carbon dioxide or other material into the container prior to, during, or after blending. This may be for carbonation of the food product in the container or for cooling of the product. Carbonation may be appropriate for products comprising ice and liquid. Cooling may be appropriate for cooling or freezing product in the container by injecting, for example, carbon dioxide snow into the product.

The container used in the apparatus of FIGS. 13 and 14 may have its lid removed but with a flexible diaphragm seal remaining in place which seal can be punctured to inject into the product, or there may be a lid with a frangible opening for injection there through.

Instead of the locating arm 47 of FIGS. 11 and 12 the apparatus of FIGS. 13 and 14 has a powered restraining plate 15 which is moveable up and down between a securing position (FIG. 14) and a non-securing position (FIG. 13) by a piston and cylinder device 51 located in the member 46. An injection tube 52 also extends along the member 46 and communicates with a reservoir 53 container carbon dioxide or other material. The tube 53 has an outlet 54 carried on the plate 50 and directed downwardly so that when the plate 50 is lowered towards a container 30 the container is located by the plate 50 and the outlet 54 enters the container for the injection of material into the container.

There may be proximity switches to prevent movement of the plate 50 if the operator has his hands in the region of the plate. In addition there may be a housing (not shown) around the apparatus with access through a door. Provision may be made so that the door must be closed before the apparatus can operate.

The outlet 54 is preferably formed of metal tube having a sharpened end so as to be able pierce the membrane or other seal over the container. The outlet 54 may be withdrawn into the plate 50 when injection is not required.

A control valve 56 is provided in the line from the reservoir 53 and the tube 52 is flexible to accommodate the up and down movement of the plate 50.

The injection arrangement described may be used to heat up the product in the container 30, for example by injecting steam or hot water from the reservoir.

Figure 16:
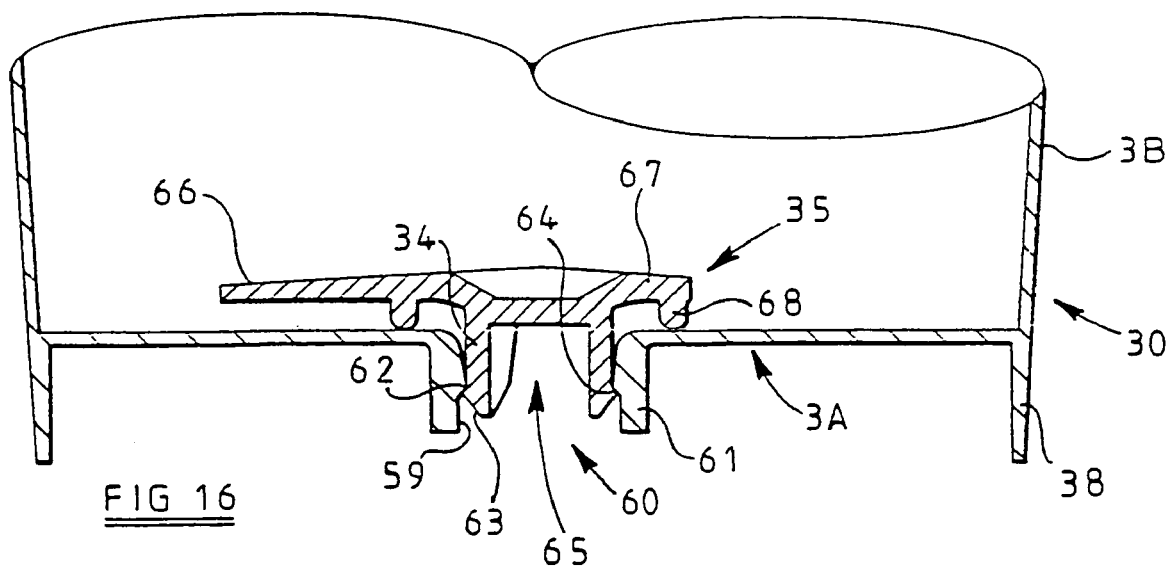
FIG. 16 is a vertical cross-section through another embodiment of blending container.
Figure 18:
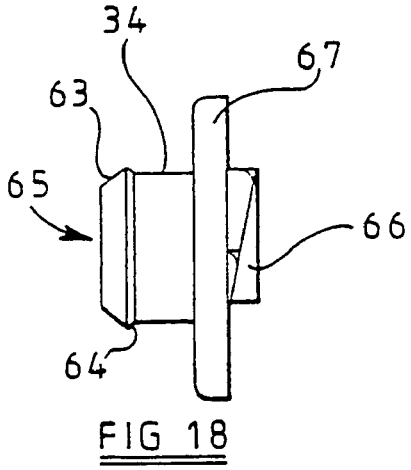
FIG. 18 is a side view of the element of FIG. 17.
Figure 17:
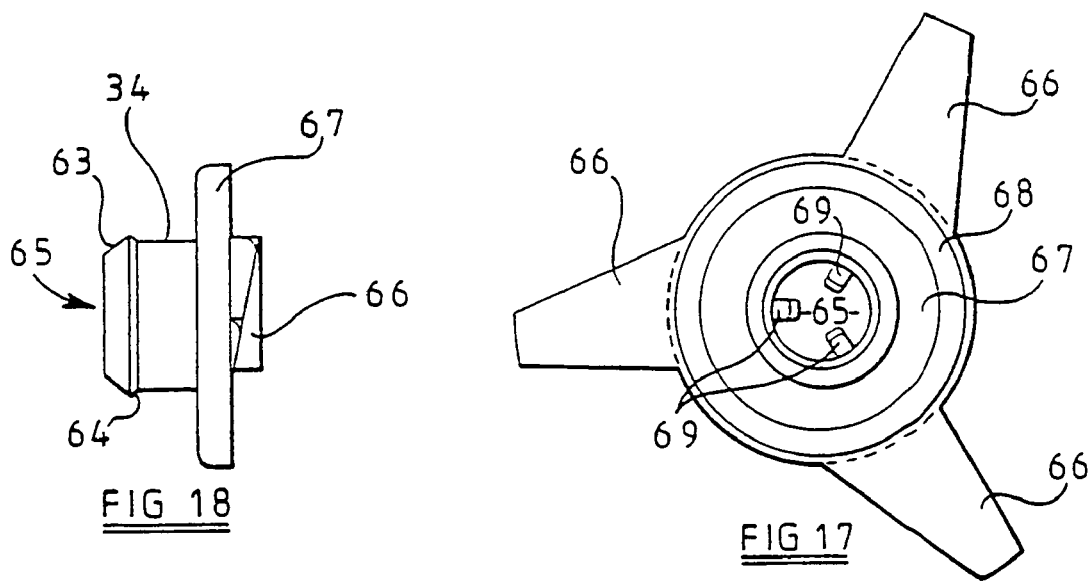
FIG. 17 is a plan view of the blending element of the FIG. 16 embodiment.

Referring now to FIGS. 16–18 there is shown another embodiment of blending container generally designated 30 in which the same reference numbers are used for similar parts in the previously described embodiments. Thus the container has a body 3 with a base 3A, upwardly diverging circular cross-section side walls 3B and blending means or an impeller 35. The container has a closure member (not shown) for sealing the upper open end of the container when filled with product. As before the container body is arranged to be nestable in other containers by location of the lower narrow end of the body within the upper open end of another container, when empty.

The lower end of the container is formed with a depending skirt portion 38 and base 3A is formed with a central opening 60 downwardly from which extends walls 61 defining a cylinder 59 of which the internal surface has a shoulder 62 and provides bearing surfaces for the blending element 35.

The blending element 35 is of injection moulded one-piece plastics construction and includes a shaft portion 34 and blending portions 66. The shaft portion 34 is formed with a tapered profile 63 at its free end and a lip 64 behind the wider end of the taper which is arranged, when assembled with the container, to engage behind the shoulder 62 of the opening 60.

The shaft portion 34 is hollow and defines a recess 65 for receiving a drive shaft (not shown) of the drive means in driving connection with the element 35. For this purpose the opening 65 has three axially extending ribs 69 or drive dogs for engaging corresponding slots in the drive shaft.

The blending portions 66 each comprise generally radially extending blades set at 1200 from one another about the rotational axis of the element 35, the blades being of relatively sharp profile at their leading edges, as seen in FIG. 18, tapering outwardly in the rearwards direction.

The portions 66 extend outwards from a central disc portion 67 extending at a right angle at the axis of rotation. Towards the radially outer edge of the disc portion 67 is formed an annular downwardly projecting portion 68 which is arranged, when the element is in position in the container 30, to engage the upper surface of the base 3A.

Assembly of the element 35 with the container is by inserting the shaft portion 34 into the opening 65 and pressing it in until the lip 64 engaged with the shoulder 62 at which position the annular portion 68 engages with the base 3A and the element is securely located in the container for rotation relative thereto.

The contacting surfaces of the element 35 and the container provide bearing surfaces during rotation. In order to improve the bearing quality of such surfaces there may be applied to the element 35, before assembly, lubricant over the relevant surfaces. However it should not be necessary to provide any seals between the bearing surfaces.

The arrangement of FIGS. 16–18 provides a simple but effective means for making and assembling the blending element and the associated container body. Since the blending element only has to perform a single blending operation of, for example, 4–60 seconds duration, albeit usually at high speed, it does not have to have the durability resulting from the need for repeated use. However the element should not break if subjected to excessive force due, for example, to the product in the container being frozen. The element should have sufficient flexibility to bend if the torque requirement for blending becomes excessive. In some arrangements it may even be desirable for the blending element to fuse with the container after a blending operation in order to prevent further use.

The lower end of the cylinder 59 is usually sealed with a heat sealed membrane for transit of the filled container and the membrane is removable or pierced before connection to the drive shaft.

Figure 19:
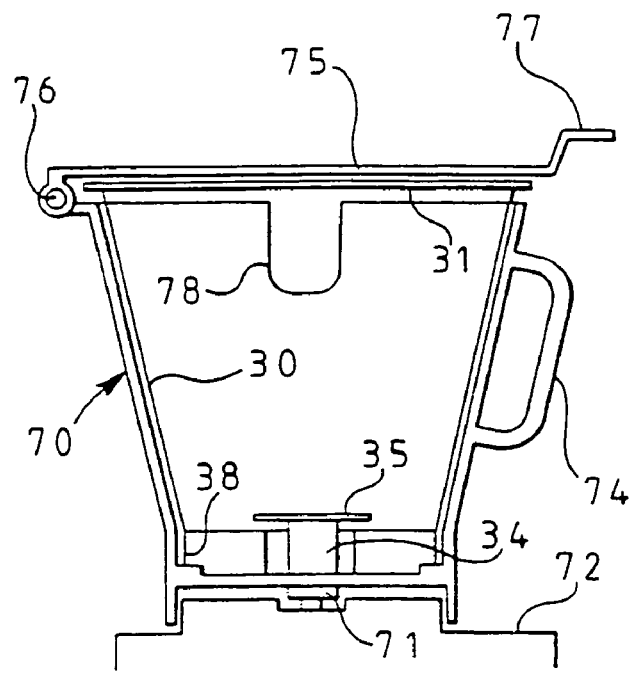
FIG. 19 shows a blending container associated with a jug.
Figure 20:
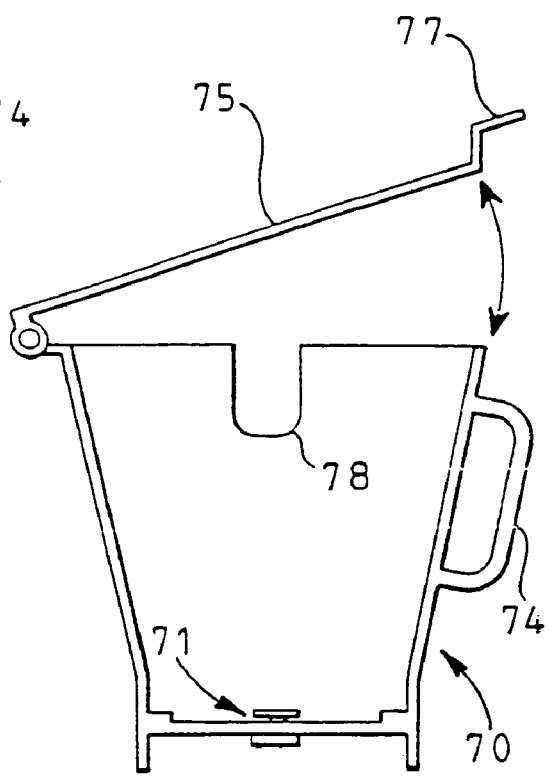
FIG. 20 shows in cross-section the jug of FIG. 19.
Figure 21:
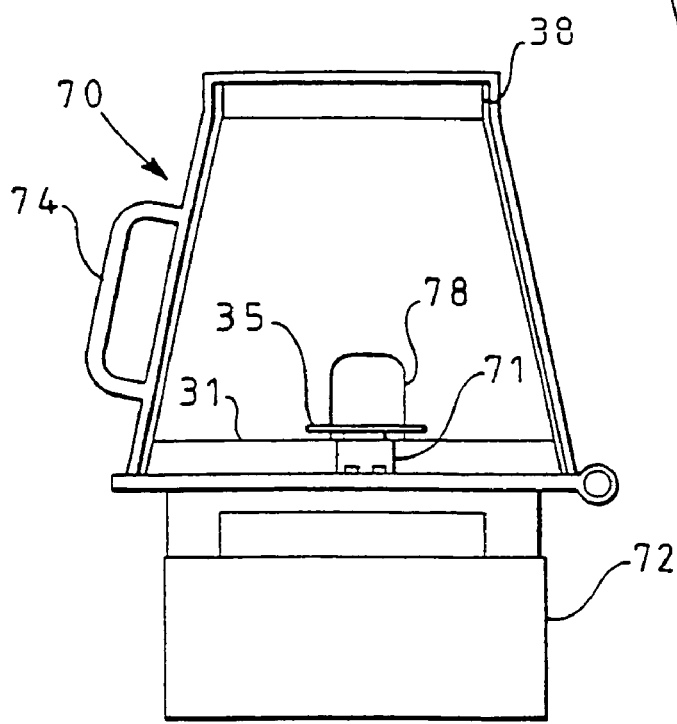
FIG. 21 shows an inverted blending container associated with a jug.

Referring now to FIGS. 19, 20 and 21 there is shown an assembly of blender container 30 with a jug 70, seen separately in FIG. 20. In this arrangement the blender container 30 may be generally of a similar form to the previously described embodiments. In FIGS. 19 and 20 the illustrated container 30 is of the kind shown in FIG. 15. In the arrangement of FIG. 21 in which the container is located in an inverted position during blending, the blender 35 is associated with the lid 31 of the container. In FIGS. 19, 20 and 21 the reference numbers used are the same as for the preceding embodiments in relation to similar parts.

The container of FIGS. 19 and 20 is associated with a jug 70 in the base of which is a coupling element 71 by which drive is transmitted from a drive mechanism in a base unit 72 to the blender 35, which drive mechanism may be as previously described. Alternatively the drive mechanism may be provided by a conventional blender drive unit.

The coupling element 71 provides coupling between the output from the drive mechanism and the blender shaft 34 and may include a clutch mechanism whereby the coupling does not transmit drive if the torque required to drive the blender becomes too great due, for example, to the product in the container having too viscous a constituency, possibly due to its being frozen.

The jug 70 is mounted removably or pivotally on the base 72 and the blending container 30 is removably located within the jug 70 so that its drive shaft drivingly the locates with the coupling element 71 of the jug when in position. The jug 70 has a handle 74 at one side and a lid 75 or cover pivoted towards one side at 76, and a lifting extension 77 to the opposite side to the pivot 76. By this arrangement the lid 75 is raised to give access to insert and remove the container 30.

The jug 70 also has a slot 78 or slots along its upper edge to enable the container 30 therein to be removed from the jug after blending.

In this arrangement the jug 70 provides a holder for the container during blending with a closure in the form of the lid 75, and the jug 70 is removable from the base 72 for cleaning. The jug 70 may also be used to remove the container 30 by lifting them together by use of the handle 74. The jug may be heated by the provision of heaters within the jug to thereby heat the container 30 prior to blending, if necessary.

In FIG. 21 a similar jug 70 to that of the preceding embodiment is provided whereby an inverted container 30 with the blender 35 in the lid is admitted to the jug, the jug is inverted and a coupling 71 is located in the lid 75 of the jug. In this case the lid 75 is secured against opening by a releasable catch during inversion and blending.

The arrangement provides means whereby the container 30 can be blended using a conventional blender base, the coupling element 71 providing an adaptor for adapting the drive from the blender to the container blending element.

Aseptically prepared or sterilised containers provide considerable advantages in that the filled containers have a relatively long shelf life without freezing being necessary. In filling containers aseptically hot product may be used at pasteurising temperatures which assists in ensuring that the container and its contents are aseptically prepared. To ensure that the container thus filled is secure against any risk of the product being exposed to the environment the blender assembly should be fully sealed against ingress or egress of contaminants. For this purpose the blender assembly may be fully sealed at least until blending is to be performed. One way of achieving such a seal is to unite the assembly and the container body with a frangible weld between the rotatable plastics components and their housing, a seal being provided until torque is applied either manually or by the drive motor to the rotatable component. Alternatively the frangible weld may be broken by the use of a tool or by engagement with a tool member when the container is placed on the drive shaft. The frangible weld is located to seal the small gap between the cooperating surfaces provided between the rotatable component and its housing. In one arrangement a portion of the container is interposed between and connected to each of an input drive rotor part and an impeller part of the blender. Said container portion is connected to the main body of the container through a frangible connection which provides the seal between the interior and exterior of the container until the connection is broken. This conveniently occurs when driving torque is applied to the blender or otherwise, as previously described.

The frangible connection may be provided by an annular weakened region of thin section.

The drive motor part and the impeller part may each be drivingly connected to each other through said portion of the container by, for example, welding to the container portion. By this means the container portion becomes part of the rotatable blender when blending takes place and said container portion becomes disconnected from the container at said frangible connection. Other means, such as a sealing ring, may also be provided for this purpose.

Utilising the container and apparatus of the invention the equipment lends itself to a manufacturing, filling, transportation and dispensing system which has wide application in dispensing foods in a hygienic and cost-effective manner.

Normally the containers will be manufactured at a manufacturing site remote from a site at which the containers are charged with the product. The containers, being intended for disposal and recycling, should occupy little space during transport to a location at which the containers are to be charged. Hence the containers are nestable with each other, as described, the base of one container being located inside and adjacent the base of another container.

The containers, still nested inside one another, are located for filling by standard filling machinery and are de-nested just prior to, during, or after each is filled. After the containers are filled with food product they are sealed by applying sealing means over the upper filling opening. The sealing means is preferably a heat sealed lid or a membrane sealed onto the rim of the upper opening. Alternatively or in addition a clip-on removable lid is applied to seal the container. In addition the base of the container is sealed to prevent any communication between the internal contents and outside. Such a seal is usually a heat sealed membrane applied across the drive access in the base of the container and removable to gain access to drive the blender 32.

After filling and sealing the container, its contents can be cooled and frozen to a low storage temperature. Alternatively the container and its contents may be kept at ambient temperatures after filling. The latter would be appropriate when the containers, its contents and the environment are aseptically controlled and in this case membrane protection over the upper filling opening and the drive shaft should be provided. In this case the container and its contents can be transported without freezing but will usually need to be cooled below freezing point before the product is blended in order to obtain ice particles in the product and to obtain a product of the temperature required for consumption, especially if the product is milk shake. However, even with aseptically controlled product, freezing can be undertaken after filling, for quality control purposes.

Filled containers at frozen or ambient temperatures are transported to their place of consumption at which the product is to be blended. In the case in which the product is at ambient temperature during transport, cooling and, if desired, freezing will be undertaken prior to blending to provide a cold product, with or without ice in it, for consumption.

In the case in which the product is transported frozen it may need to be tempered to higher, but still frozen, temperature prior to blending. This may be done in a tempering cabinet, set at a tempering temperature, in which the containers are stored and warmed up to a dispensing/blending temperature.

When the product is to be consumed, the container is placed in the blending apparatus and blending is effected, as described. Blending may involve penetration or removal of the seal on the base to access the blender drive. Usually the upper opening remains sealed during blending except when injection into the container is required.

When blended the product is ready for consumption by piercing the seal or by removing the seal to gain access to the contents by a straw, spoon or by pouring, as required. After consumption from the container the empty container is disposed of. Disposal is cost-effective because the container is, by its construction, relatively cheap to make, even with the in-built blender.

It will be seen that the blending apparatus offers the opportunity of dispensing blended products in a quick, safe and hygienic environment with the possibility of filling containers at a remote location or of introducing the product component just prior to blending. The arrangement is cost effective and efficient.

The invention claimed is:

1. A method of dispensing blended food products in a container having rotary blending means for blending within the container, the blending means being driveably connectable to drive means externally of the container, wherein product to be blended is introduced into the container, a lid is applied to the container, the container is located so that the blending means is in driving engagement with the drive means, the drive means is actuated to cause the blending means to operate and blend the contents within the container, wherein the container is located in a seating for blending, with the drive means directed upwardly for engagement with the blending means, and is held in an operational blending mode by a powered restraining plate which is moveable up and down between a securing position and a non-securing position, wherein the container is inverted before blending so that the lid is lowermost during blending.

2. A method according to claim 1, wherein the seating includes locating means for locating the container during blending.

3. A method according to claim 1, wherein the container contents are heated prior to blending.

4. A method according to claim 1, wherein the container contents are cooled prior to blending.

5. A method according to claim 1, wherein the container contents are aerated prior to, during, or after blending.

6. A method of dispensing blended food products in a container having rotary blending means for blending within the container, the blending means being driveably connectable to drive means externally of the container, wherein product to be blended is introduced into the container, a lid is applied to the container, the container is located so that the blending means is in driving engagement with the drive means, the drive means is actuated to cause the blending means to operate and blend the contents within the container, wherein the container is located in a seating for blending, with the drive means directed upwardly for engagement with the blending means, and is held in an operational blending mode by a powered restraining plate which is moveable up and down between a securing position and a non-securing position, wherein multiple containers are nested with each other by locating a container into an open end of another container after manufacture and before transportation to a container filling location at which the multiple containers are de-nested from one another.

7. A method of dispensing blended food products in a container having rotary blending means for blending within the container, the blending means being driveably connectable to drive means externally of the container, wherein product to be blended is introduced into the container, a lid is applied to the container, the container is located so that the blending means is in driving engagement with the drive means, the drive means is actuated to cause the blending means to operate and blend the contents within the container, wherein the container is located in a seating for blending, with the drive means directed upwardly for engagement with the blending means, and held in an operational blending mode by clamping means movable from above between a securing position and a non-securing position, and wherein the container is inverted before blending so that the lid is lowermost during blending.

8. A method of dispensing blended food products in a container having rotary blending means for blending within the container, the blending means being driveably connectable to drive means externally of the container, wherein product to be blended is introduced into the container, the lid is applied to the container, the container is located so that the blending means is in driving engagement with the drive means, the drive means is actuated to cause the blending means to operate and blend the contents within the container, wherein the container is located in a seating for blending, with the drive means directed upwardly for engagement with the blending means, and held in an operational blending mode by clamping means movable from above between a securing position and a non-securing position, and wherein multiple containers are nested with each other by locating a container into an open end of another container after manufacture and before transportation to a container filling location at which the multiple containers are de-nested from one another.

9. A method of dispensing blended food products in a container having rotary blending means within the container, the blending means being located on a lid for the container and being driveably connectable to drive means externally of the container, wherein product to be blended is introduced into the container, the lid is applied to the container, the container is located in a seating for blending, with the drive means directed upwardly for engagement with the blending means, the container is located so that the blending means is in driving engagement with the drive means, and the drive means is actuated to cause the blending means to operate and blend the contents within the container, wherein the container is inverted before blending so that the lid is lowermost during blending, and wherein the container is held in an operational blending mode by a locking tube moving reciprocably between a securing position and a non-securing position.

* * * * *